US008635360B2

(12) United States Patent
Brase et al.

(10) Patent No.: US 8,635,360 B2
(45) Date of Patent: Jan. 21, 2014

(54) MEDIA PLAYBACK POINT SEEKING USING DATA RANGE REQUESTS

(75) Inventors: Ryan Brase, Minneapolis, MN (US); Andrew LeMay, Minneapolis, MN (US); Nicholas Wormley, St. Paul, MN (US)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 12/252,782

(22) Filed: Oct. 16, 2008

(65) Prior Publication Data

US 2009/0106356 A1 Apr. 23, 2009

Related U.S. Application Data

(60) Provisional application No. 60/981,164, filed on Oct. 19, 2007.

(51) Int. Cl.
*G06F 15/16* (2006.01)
(52) U.S. Cl.
USPC .......................................... 709/232; 709/231
(58) Field of Classification Search
USPC ................................................ 709/231–232
See application file for complete search history.

(56) References Cited

U.S. PATENT DOCUMENTS

| 4,881,264 A | 11/1989 | Merkle |
| 5,822,537 A | 10/1998 | Katseff et al. |
| 5,953,506 A | 9/1999 | Kalra et al. |
| 6,141,659 A | 10/2000 | Barker et al. |
| 6,195,680 B1 | 2/2001 | Goldszmidt et al. |

(Continued)

FOREIGN PATENT DOCUMENTS

| EP | 0911728 | 4/1999 |
| EP | 1 298 931 A2 | 4/2003 |

(Continued)

OTHER PUBLICATIONS

U.S. Appl. No. 12/463,971, entitled "Live Media Delivery Over a Packet-Based Computer Network," filed May 11, 2009.

(Continued)

*Primary Examiner* — Thomas Dailey
*Assistant Examiner* — Ebrahim Golabbakhsh
(74) *Attorney, Agent, or Firm* — Turocy & Watson, LLP

(57) ABSTRACT

Techniques are described for downloading user-selected segments of media objects. As described herein, a user may demand that a client device present a segment of a media object when the client device has not yet downloaded the data that represents the partial segment of the media object. The client device may then output two separate requests to a server that hosts the media object. The first request specifies a resource identifier of the media object and a first data range. Data in the first range specifies a format of data of the media object. The second request specifies the resource identifier of the media object and a second data range. Data in the second range represents the requested partial segment of the media object. When the client device receives the data, the client device uses the data in the first range to present the data in the second range.

27 Claims, 8 Drawing Sheets

(56) References Cited

U.S. PATENT DOCUMENTS

| | | | |
|---|---|---|---|
| 6,339,785 | B1 | 1/2002 | Feigenbaum |
| 6,477,522 | B1 | 11/2002 | Young |
| 6,601,136 | B2 | 7/2003 | Gunaseelan et al. |
| 6,742,023 | B1 | 5/2004 | Fanning et al. |
| 6,771,674 | B1 | 8/2004 | Schuster et al. |
| 6,772,337 | B1 | 8/2004 | Yener |
| 6,937,770 | B1 | 8/2005 | Oguz et al. |
| 7,047,309 | B2 | 5/2006 | Baumann et al. |
| 7,058,721 | B1 | 6/2006 | Ellison et al. |
| 7,069,014 | B1 | 6/2006 | Thenthiruperai et al. |
| 7,133,368 | B2 | 11/2006 | Zhang et al. |
| 7,185,082 | B1 | 2/2007 | del Val et al. |
| 7,251,691 | B2 | 7/2007 | Boyd et al. |
| 7,277,621 | B2 * | 10/2007 | Kunieda et al. ............... 386/281 |
| 7,277,950 | B1 | 10/2007 | Chapweske |
| 7,555,559 | B2 | 6/2009 | Chapweske |
| 7,962,637 | B2 | 6/2011 | Su et al. |
| 8,250,191 | B2 | 8/2012 | Hickmott et al. |
| 8,346,225 | B2 | 1/2013 | Raleigh |
| 2001/0051996 | A1 | 12/2001 | Cooper et al. |
| 2002/0002708 | A1 | 1/2002 | Arye |
| 2002/0003541 | A1 | 1/2002 | Boyd et al. |
| 2002/0042924 | A1 | 4/2002 | Adams |
| 2002/0049760 | A1 | 4/2002 | Scott et al. |
| 2002/0049846 | A1 | 4/2002 | Horen et al. |
| 2002/0065922 | A1 | 5/2002 | Shastri |
| 2002/0095400 | A1 | 7/2002 | Johnson et al. |
| 2002/0108112 | A1 * | 8/2002 | Wallace et al. ................. 725/40 |
| 2002/0133247 | A1 | 9/2002 | Smith et al. |
| 2002/0138443 | A1 | 9/2002 | Schran et al. |
| 2002/0161909 | A1 | 10/2002 | White |
| 2002/0170067 | A1 | 11/2002 | Norstrom et al. |
| 2003/0067872 | A1 | 4/2003 | Harrell et al. |
| 2003/0123546 | A1 | 7/2003 | Falik et al. |
| 2004/0064573 | A1 | 4/2004 | Leaning et al. |
| 2004/0078470 | A1 | 4/2004 | Baumeister et al. |
| 2004/0093396 | A1 | 5/2004 | Akune |
| 2004/0111526 | A1 | 6/2004 | Baldwin et al. |
| 2004/0184774 | A1 * | 9/2004 | Kunieda et al. ................. 386/69 |
| 2004/0193900 | A1 | 9/2004 | Nair |
| 2004/0205093 | A1 | 10/2004 | Li et al. |
| 2004/0267503 | A1 | 12/2004 | Batterberry et al. |
| 2004/0267940 | A1 | 12/2004 | Dideriksen et al. |
| 2005/0010792 | A1 | 1/2005 | Carpentier et al. |
| 2005/0021575 | A1 | 1/2005 | Boyd et al. |
| 2005/0102371 | A1 | 5/2005 | Aksu |
| 2005/0165849 | A1 | 7/2005 | Moradi et al. |
| 2005/0183120 | A1 | 8/2005 | Jain et al. |
| 2006/0026161 | A1 | 2/2006 | Henseler |
| 2006/0235883 | A1 | 10/2006 | Krebs |
| 2007/0078876 | A1 | 4/2007 | Hayashi et al. |
| 2007/0088844 | A1 * | 4/2007 | Seims ............................ 709/231 |
| 2007/0157267 | A1 * | 7/2007 | Lopez-Estrada ................ 725/90 |
| 2007/0261072 | A1 | 11/2007 | Boulet et al. |
| 2008/0040497 | A1 | 2/2008 | Venkatramani et al. |
| 2008/0046917 | A1 | 2/2008 | de Heer |
| 2008/0050096 | A1 * | 2/2008 | Ryu ................................ 386/99 |
| 2008/0104121 | A1 | 5/2008 | Gottlieb et al. |
| 2008/0140720 | A1 | 6/2008 | Six et al. |
| 2008/0141317 | A1 | 6/2008 | Radloff et al. |
| 2008/0201416 | A1 * | 8/2008 | Lipton ........................... 709/203 |
| 2009/0180430 | A1 | 7/2009 | Fadell |
| 2009/0185619 | A1 | 7/2009 | Taleb et al. |
| 2009/0328124 | A1 | 12/2009 | Khouzam et al. |
| 2010/0023579 | A1 | 1/2010 | Chapweske et al. |
| 2010/0191656 | A1 | 7/2010 | Martin et al. |

FOREIGN PATENT DOCUMENTS

| | | |
|---|---|---|
| EP | 1605460 | 12/2005 |
| EP | 1 638 333 A1 | 3/2006 |
| EP | 1848214 | 10/2007 |
| GB | 2374746 | 10/2002 |
| GB | 2 395 387 A | 5/2004 |
| JP | 2003067284 | 3/2003 |
| WO | WO 2007/063430 A2 | 6/2007 |
| WO | WO 2009/075766 A3 | 6/2009 |

OTHER PUBLICATIONS

Notification of Transmittal of the International Search Report and the Written Opinion of the International Searching Authority, or the Declaration for corresponding patent application No. PCT/US2008/011801, mailed May 19, 2009, 12 pages.

U.S. Appl. No. 12/328,139, filed Dec. 4, 2008, entitled "Dynamic Bit Rate Scaling,"

Kaminsky, D., "Vectorcast: A Proposal Regarding the efficient Distribution of Data On High Bandwidth Networks," Jan. 12, 1998, 4 pages.

Francis, P., "Yallcast: Extending the Internet Multicast Architecture," Sep. 30, 1999, pp. 1-39.

Byers, J. et al., "Accessing Multiple Mirror Sites in Parallel: Using Tornado Codes to Speed Up Downloads," Apr. 1999, pp. 275-283.

Dessent, Brian, "Brian's BitTorrent FAQ and Guide", May 10, 2003, accessed from http://www.dessent.net/btfaq, 40 pgs.

Koman, Richard, "The Swarmcast Solution", May 24, 2001, accessed from http://openp2p.com/lpt/a/883, 4 pgs.

Padmanabhan et al., "Distributing Streaming Media Content Using Cooperative Networking", Proceedings of the 12$^{th}$ International Workshop on Network and Operating Systems Support for Digital Audio: NOSSDAV, May 12-14, 2002, pp. 177-186.

Byers et al., "A Digital Fountain Approach to Reliable Distribution of Bulk Data", Proc. ACM SIGCOMM, ACM Press, New York, 1998, pp. 56-67.

V.K. Goyal, "Multiple Description Coding: Compression Meets the Network", IEEE Signal Processing Magazine, vol. 18, 2001, pp. 74-93.

Chu et al., "A Case for End System Multicast", Proceedings ACM SIGMETRICS 2000: International Conference on Measurement and Modeling of Computer Systems, Jun. 17-21, 2001, pp. 1-12.

"Video Compression Picture Types", from Wikipedia, the free encyclopedia, http://en.wikipedia.org/w/index.php?title=Video_compression_picture_types&oldid=252563025, XP-002571418, printed Mar. 4, 2010, 5 pages.

International Preliminary Report on Patentability from international application No. PCT/US2008/011801, dated Apr. 20, 2010, 8 pp.

U.S. Appl. No. 60/992,471, filed Dec. 5, 2007, entitled "Dynamic Bit Rate Scaling," by Wormley et al.

U.S. Appl. No. 12/328,139, filed Dec. 4, 2008, entitled "Dynamic Bit Rate Scaling," by Wormley et al.

U.S. Appl. No. 61/052,459, filed May 12, 2008, entitled "Live Media Delivery Over a Packet-Based Computer Network ," by Chapweske et al.

Rejaie et al., "Architectural Considerations for Playback of Quality Adaptive Video Over the Internet," Proceedings IEEE International Conference on Networks, Sep. 2000, pp. 204-209.

Wang, "Traffic Regulation under the Percentile-Based Pricing Policy," Proceedings of the First International Conference on Scalable Information Systems, Jun. 2006, 8 pp.

Duffield et al., "Issues of Quality and Multiplexing When Smoothing Rate Adaptive Video," IEEE Transactions on Multimedia, vol. 1, No. 4, Dec. 1999, 13 pp.

Gürses et al., "A Simple and Effective Mechanism for Stored Video Streaming with TCP Transport and Server-Side Adaptive Frame Discard," Computer Networks, 48, Dec. 30, 2004, pp. 489-501.

Birney, "Intelligent Streaming," Inside Windows Media, Microsoft Corporation, Nov. 19, 1999, XP-002177089, (9 pgs.).

Office Action from U.S. Appl. No. 12/328,139, dated Feb. 9, 2011, 14 pp.

Response to Office Action dated Feb. 9, 2011, from U.S. Appl. No. 12/328,139, dated Apr. 11, 2011, 10 pp.

Advisory Action from U.S. Appl. No. 12/328,139, dated May 5, 2011, 3 pp.

Responsive Amendment after Final Office Action dated Feb. 9, 2011, and Advisory Action dated May 5, 2011, for U.S. Appl. No. 12/328,139, filed May 9, 2011, 20 pp.

(56) References Cited

OTHER PUBLICATIONS

Office Action from U.S. Appl. No. 12/486,589, dated May 31, 2011, 12 pp.

Response to Office Action dated May 31, 2011, from U.S. Appl. No. 12/486,589, filed Aug. 31, 2011, 19 pp.

Invitation to Pay Additional Fees and, Where Applicable, Protest Fee and Annex to the Invitation to Pay Additional Fees entitled "Communication Relating to the Results of the Partial International Search" mailed Feb. 12, 2009 for corresponding Application No. PCT/US2008/009489, (5 pages).

Notification of Transmittal of the International Search Report and the Written Opinion of the International Searching Authority, or the Declaration for corresponding patent applicaion No. PCT/US2008/009489, mailed May 27, 2009, 16 pages.

U.S. Appl. No. 61/073,542, entitled "Dynamic Media Bit Rates Based on Enterprise Data Transfer Policies," filed Jun. 18, 2008.

U.S. Appl. No. 10/788,695, entitled "Parallel Data Transfer Over Multiple Channels With Data Order Prioritization," filed Feb. 27, 2004.

U.S. Appl. No. 61/119,854, entitled, "Adaptive Playback Rate With Look-Ahead," filed Dec. 4, 2008.

U.S. Appl. No. 12/486,589, entitled "Dynamic Media Bit Rates Based on Enterprise Data Transfer Policies," filed Jun. 17, 2009.

Notification Concerning Transmittal of International Preliminary Report on Patentability (Chapter I of the Patent Cooperation Treaty) for corresponding patent application No. PCT/US2008/013368, mailed Jun. 17, 2010, 9 pages.

Office Action for U.S. Appl. No. 12/328,139, dated Sep. 20, 2010, 49 pages.

Notice of Allowance for U.S. Appl. No. 12/187,472, dated Apr. 19, 2010, 19 pages.

Office Action for U.S. Appl. No. 12/328,139, dated Mar. 6, 2013, 18 pages.

Sun, et al., "Seamless Switching of Scalable Video Bitstreams for Efficient Streaming," IEEE Transaction on Multimedia, vol. 6, No. 2, Apr. 2004, pp. 291-303.

Office Action for U.S. Appl. No. 12/328,139, dated Nov. 16, 2012, 28 pages.

Notice of Allowance for U.S. Appl. No. 12/328,139, dated May 21, 2013, 20 pages.

\* cited by examiner

MEDIA PLAYBACK POINT SEEKING USING DATA RANGE REQUESTS

This application claims priority from U.S. Provisional Application Ser. No. 60/981,164 filed Oct. 19, 2007, the entire contents of which is incorporated herein by reference.

RELATED APPLICATIONS

This application incorporates by reference U.S. Provisional Application Ser. No. 60/992,471 filed Dec. 5, 2007, entitled "Dynamic Bit Rate Scaling." This application also incorporates by reference U.S. Provisional Application Ser. No. 61/052,459 filed May 12, 2008, entitled "Live Media Delivery Over a Packet-Based Computer Network."

TECHNICAL FIELD

The invention relates to computer networks and specifically to downloading media data through computer networks.

BACKGROUND

As evidenced by the popularity of video sharing web sites, video is an increasingly important feature of the World Wide Web. In a typical scenario, a server hosts a file that stores all of the data of a video. When a user wants to use a client device to view the video, the client device requests the file from the server. In response to the request, the server sends data in the file to the client device, starting with data that represents the beginning of the video and ending with data that represents the end of the video. The client device may begin to present the video before the client device has received all of the data in the video file. This is known as "progressive download." After the client device has completely downloaded all of the data in the video file, the client device may present any portion of the video without downloading any additional data from the server.

SUMMARY

Techniques are described for downloading user-selected segments of media objects. As described herein, a user may demand that a client device present a segment of a media object when the client device has not yet downloaded the data that represents the partial segment of the media object. The client device may then output two separate requests to a server that hosts the media object. The first request specifies a resource identifier of the media object and a first data range. Data in the first range specify a format of data of the media object and other data. The second request specifies the resource identifier of the media object and a second data range. Data in the second range represents the requested partial segment of the media object. When the client device receives the data, the client device uses the data in the first range to present the data in the second range.

In one example, a method comprises receiving, with a device, a demand to present a segment of a media object. The segment starts at a playback point of the media object after an initial playback point of the media object. The device has not yet received data that represents the segment. The method also comprises outputting, in response to the demand, a first request that specifies a resource identifier associated with all data in the media object and that specifies a first range. In addition, the method comprises outputting, in response to the demand, a second request that specifies the resource identifier associated with all of the data in the media object and that specifies a second range. The data that represents the segment of the media object is within the second range. Furthermore, the method comprises receiving, as a response to the first request, the data of the media object that is within the first range. The data of the media object that is within the first range indicates metadata regarding the data in the media object within a second range. In addition, the method comprises receiving, as a response to the second request, the data of the media object that is within the second range.

In another example, a device comprises one or more network interfaces coupled to a network. The device also comprises a media player that receives a demand to present a segment of a media object. The segment starts at a playback point of the media object after an initial playback point of the media object. The device has not yet received data that represents the segment. In addition, the device comprises a presentation unit capable of displaying data based on data in the media object. Furthermore the device comprises a download agent that, as a response to the media player receiving the demand, instructs one or more network interfaces of the device to output a first request that specifies a resource identifier associated with all the data in the media object and that specifies a first range. The download agent, as a response to the media player receiving the demand, instructs one or more of the network interfaces to output a second request that specifies the resource identifier associated with all the data in the media object and that specifies a second range. The data that represents the segment of the media object is within the second range. Furthermore, the download agent receives, as a response to the first request, the data of the media object that is within the first range. The data of the media object that is within the first range indicates metadata regarding the data in the media object within the second range. The download agent also receives, as a response to the second request, the data of the media object that is within the second range.

In another example, a computer-readable medium comprises instructions that, when executed by one or more processors of a device, cause the one or more processors to receive a demand to present a segment of a media object. The segment starts at a playback point of the media object after an initial playback point of the media object. The device has not yet received data that represents the segment of the media object. The instructions also cause the one or more processors to instruct, in response to the demand, one or more network interfaces of the device to output a request that specifies a resource identifier associated with all data in the media object and that specifies a first range. In addition, the instructions cause the one or more processors to instruct, in response to the demand, one or more of the network interfaces to output a second request that specifies the resource identifier associated with all the data in the media object and that specifies a second range. The data that represents the segment of the media object is within the second range. Furthermore, the instructions cause the one or more processors to enable one or more of the network interfaces to receive, as a response to the first request, the data of the media object that is within the first range. The data of the media object that is within the first range indicates metadata regarding the data in the media object within the second range. In addition, the instruction cause the one or more processors to enable one or more of the network interfaces to receives, as a response to the second request, the data of the media object that is within the second range. The instructions also cause the one or more processors to use the data of the media object that is within the first range to convert the data within the second range into presentable data. In addition, the instructions cause the one or more processors to instruct a presentation unit of the device to present the presentable data, thereby causing the presentation unit to present the segment of the media object.

In another example, a system comprises a client device and a web cache server. The client device comprises one or more network interfaces coupled to a network. The client device also comprises a media player that receives a demand to present a segment of a media object. The segment starts at a playback point of the media object after an initial playback point of the media object. The client device has not yet received data that represents the segment of the media object. The client device also comprises a presentation unit capable of displaying data based on the data in the media object. In addition, the client device comprises a download agent that, as a response to the media player receiving the demand, instructs one or more network interfaces of the device to output a first request that specifies a resource identifier associated with all the data in the media object and that specifies a first range. The download agent, as a response to the media player receiving the demand, instructs one or more of the network interfaces to output a second request that specifies the resource identifier associated with all the data in the media object and that specifies a second range. The data that represents the segment of the media object is within the second range. Furthermore, the download agent receives, as a response to the first request, the data of the media object that is within the first range. The data of the media object that is within the first range indicates metadata regarding the data in the media object within the second range. The download agent also receives, as a response to the second request, the data of the media object that is within the second range. The media player is further configured to use the data of the media object that is within the first range to convert the data within the second range into presentable data. In addition, the media player is further configured to instruct the presentation unit to present the presentable data, thereby causing the presentation unit to present the segment of the media object. A web caching server receives the first request and the second request. The web caching server comprises a resource cache that stores resources hosted by other servers. The web caching server also comprises a cache manager that uses resource identifiers in requests from requesting devices to determine whether the resource cache stores resources identified by the resource identifiers; and that sends requested resources to the requesting devices when the web caching server caches the requested resource.

In another example, a device comprises means for receiving, with a device, a demand to present a segment of a media object. The segment starts at a playback point of the media object after an initial playback point of the media object. The device has not yet received data that represents the segment. The device further comprises means for outputting, in response to the demand, a first request that specifies a resource identifier associated with all data in the media object and that specifies a first range, means for outputting, in response to the demand, a second request that specifies the resource identifier associated with all of the data in the media object and that specifies a second range. The data that represents the segment of the media object is within the second range. The device further comprises means for receiving, as a response to the first request, the data of the media object that is within the first range. The data of the media object that is within the first range indicates metadata regarding the data in the media object within the second range. The device further comprises means for receiving, as a response to the second request, the data of the media object that is within the second range.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
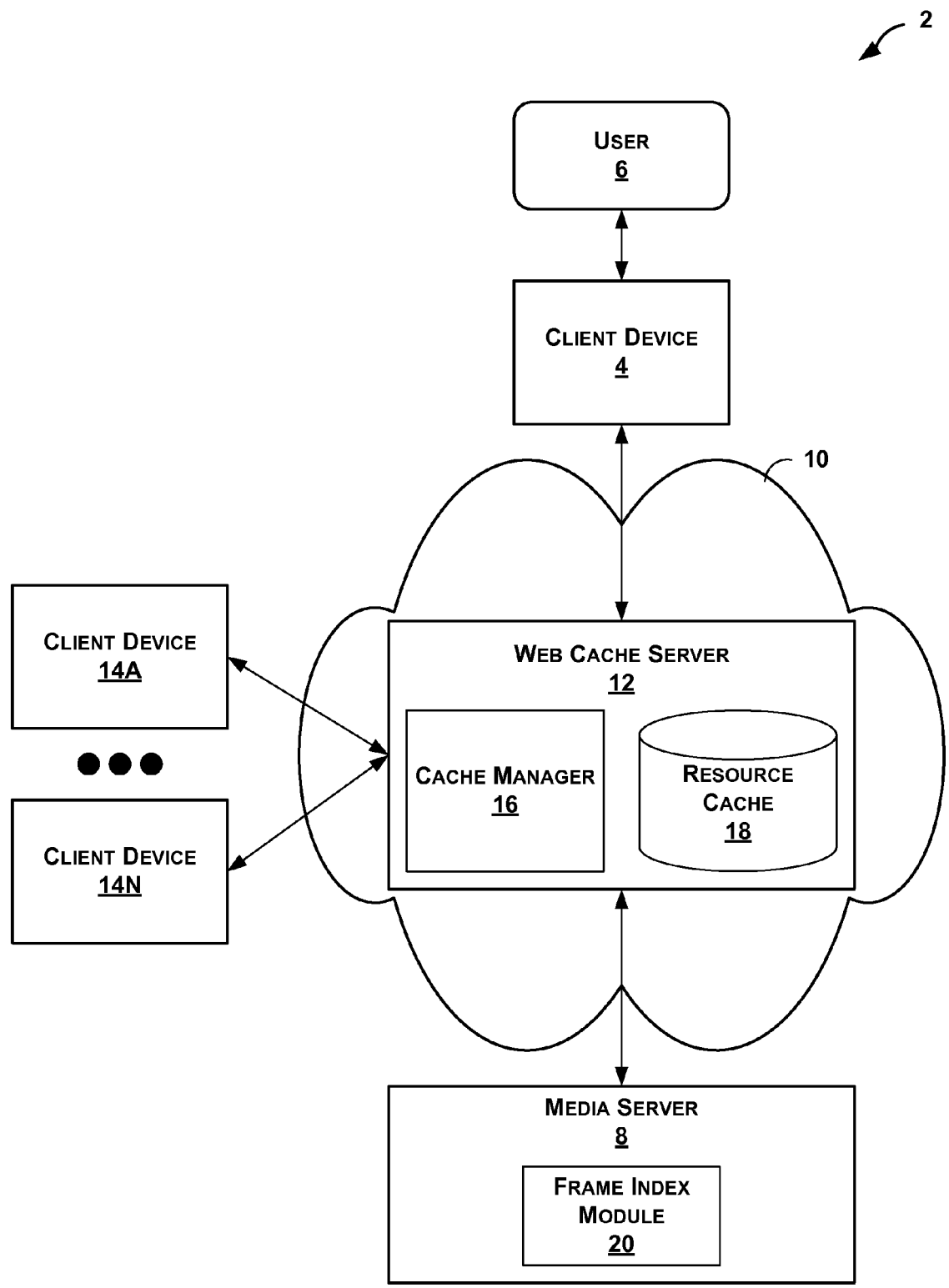
FIG. 1 is a block diagram illustrating an exemplary system in which a client device requests a media object from a media server via a network.

FIG. 1 is a block diagram illustrating an exemplary system 2. As illustrated in the example of FIG. 1, system 2 includes a client device 4. Client device 4 may be a wide variety of different types of network devices. For example, client device 4 may be a personal computer, a laptop computer, a mobile telephone, a personal media player, a device integrated into a vehicle, a network kiosk, a mainframe computer, a television set top box, a network television, a digital video recorder, or other type of device capable of requesting, receiving, and presenting digital media data.

Furthermore, as illustrated in the example of FIG. 1, system 2 includes a user 6. User 6 may use client device 4 to view media objects. As used in this disclosure, a media object is a set of sequential media data. Example media objects include video clips, television programs, movies, audio recordings, and other sets of sequential media data. Media objects may be encoded in a variety of ways. For instance, media objects may be encoded as Flash™ video files, QuickTime™ files, or in accordance with other coding standards.

In the example of FIG. 1, system 2 includes a media server 8 that hosts a media object. In other words, media server 8 makes a media object available to be downloaded. When user 6 wants client device 4 to present the media object hosted by media server 8, user 6 may demand that client device 4 present the media object. User 6 may demand that client device 4 present the media object in a variety of ways. For example, user 6 may demand client device 4 to present the media object by navigating a web browser operating on client device 4 to a web page in which the media object is embedded. In another example, user 6 may demand client device 4 to present the media object by providing a resource identifier of the media object to a media player application operating on client device 4.

Client device 4 is communicatively coupled to a network 10. Network 10 may be a home network, a network operated by an Internet Service Provider ("ISP"), or another type of network. When client device 4 receives a request to present all of a media object hosted by media server 8, client device 4 outputs a request on network 10. This request may specify a resource identifier associated with the media object. For example, this request may be a Hyper Text Transfer Protocol ("HTTP") request that specifies a resource identifier associated with the media object. Client device 4 may subsequently receive data of the media object. When client device 4 receives data of the media object, client device 4 may present media data based on the data of the media object.

Before client device 4 has received all data of the media object, user 6 may demand that client device 4 present a segment of the media object before client device 4 has received data that represents that segment of the media object. In other words, user 6 may demand that client device 4 "skip ahead" to a playback point of the media object before client device 4 has downloaded the data of the media object that represents the playback point. A "playback point" is a specific time along a timeline from the beginning of a media object to the end of the media object. For example, client device 4 may have received data that represents the first through the fifth minute of a ten minute media object. In this example, client device 4 may have presented the first through the third minute of the media object. Furthermore, in this example, user 6 may demand that client device 4 present a segment of the media object that starts at the seventh minute of the media object and lasts through the end of the media object.

When user 6 demands that client device 4 present a segment of the media object before client device 4 has received data that represents the segment of the media object, client device 4 may send a request for range identification data associated with the media object to media server 8. When media server 8 receives the request for range identification data, a frame index module 20 in media server 8 may send the range identification data to client device 4. In one exemplary implementation, the range identification data associated with a media object may indicate a portion of the media object that specifies metadata regarding media data of the media object. For instance, the range identification data associated with a media object may indicate that bytes 0 through 100 constitute metadata that specifies a format used to encode media data stored in the remaining bytes of the media object. In addition, the range identification data associated with a media object may include a key frame list that indicates byte indexes associated with key frames of the media object. As used in this disclosure, a key frame of a media object is a video frame that is not encoded with reference to other frames. For instance, in the context of H.264 coding, key frames are referred to as "i-frames." An exemplary key frame list may indicate that a key frame associated with the first minute of the media object starts at the $200^{th}$ byte, a key frame associated with the second minute of the media object starts at the $400^{th}$ byte, a key frame associated with the third minute of the media object starts at the $520^{th}$ byte, and so on.

After client device 4 receives the range identification data associated with the media object, client device 4 may use the range identification data to identify a first range. Data of the media object within the first range may specify metadata regarding the media data of the media object. For example, the metadata may indicate that video frames in the media object are encoded in accordance with the H.264 format and are to be presented at a rate of 35 frames per second. In addition, the metadata may indicate other data. For instance, the metadata may indicate copyright information, may indicate whether the media object is to be presented in black and white, may include information that identifies an artist associated with the media object, and may include other information.

Client device 4 may use a key frame list in the range identification data associated with the media object to identify a second range. For instance, client device 4 may identify one of the key frames in the key frame list as a key frame that is associated with a playback point closest to a playback point at the beginning of the segment and may identify one of the key frames in the key frame list as a key frame that is associated with a playback point closest to a playback point at the end of the segment. For example, user 6 may select a playback point for the beginning of the segment at playback point 50% of the way through the media object. In this example, there may not be a key frame associated with a playback point 50% of the way through the media object. Furthermore, in this example, client device 4 may identify the key frame that is associated with a playback point that is closest to a playback point 50% of the way through the media object. Similarly, user 6 may select a playback point 90% of the way through the media object for the end of the segment and client device 4 may identify a key frame that is associated with a playback point that is closest to the playback point at 90% of the way through the media object. After identifying the key frame that is closest to the playback point at the beginning of the segment and the key frame that is closest to the playback point at the end of the segment, client device 4 may identify the second range as the range from the byte index associated with the key frame that is closest to the playback point at the beginning of the segment to the byte index associated with the key frame that is closest to the playback point at the end of the segment. When the playback point at the end of the segment is the ending playback point of the media object, client device 4 may identified the second range as the range from the byte index associated with the key frame that is closest to the playback point at the beginning of the segment to the byte index associated with the last byte of the media object.

After client device 4 identifies the first range and the second range, client device 4 may determine whether client device 4 has cached data of the media object in the first range. If client device 4 has not cached data of the media object in the first range, client device 4 may output a first request that specifies a resource identifier associated with all data in the media object and that specifies a first range of data within the media object. For example, in an exemplary implementation in which client device 4 uses HTTP to request and receive data of the media object, client device 4 may, for example, output a first HTTP request that includes, in a header of the first HTTP request, a resource identifier associated with all data in the media object and a range element that specifies the first range. In this example, the range element may specify the first range by specifying a byte index of a first byte and a byte index the last byte of the range. For instance, the first HTTP request may specify the resource identifier "/media/video_clip.flv" and the range element may specify the first range by specifying that the first range starts at byte 0 of the media object and ends at byte 100 of the media object. In this instance, the first HTTP request may appear in part as:

GET /media/video_clip.flv HTTP/1.0
Range: bytes=0-100

In addition, client device 4 outputs a second request. The second request specifies the resource identifier associated with all data in the media object and specifies the second range of data within the media object. For example, client device 4 may output a second HTTP request that includes, in a header of the second HTTP request, the resource identifier associated with all data in the media object and a range element that specifies the second range. In this example, the range element may specify the second range by specifying a byte index of a first byte of the second range and a byte index of the last byte of the second range. For instance, the second HTTP request may specify the resource identifier "/media/video_clip.flv" and the range element may specify the second range by specifying that the second range starts at byte 7000 of the media object and ends at byte 9000 of the media object. In this instance, the second HTTP request may appear as:

GET /media/video_clip.flv HTTP/1.0
Range: bytes=7000-9000

After client device 4 outputs the first request and the second request, client device 4 may receive data of the media object that is within the first range and data of the media object that is within the second range. Upon receiving all of the data within the first range and at least some of the data in the second range, client device 4 may use the data within the first range to convert the data in the second range into presentable data. For example, if the data in the first range indicates that the data in the second range is formatted in accordance with the H.264 standard, client device 4 may convert the data in the second range from the H.264 standard into a set of Red-Green-Blue pixels that may be presented on a monitor. In another example, if the data in the first range indicates that the data in the second range is formatted in accordance with the Flash/VP6 standard, client device 4 may convert the data in the second range from the Flash/VP6 standard into a set of Red-Green-Blue pixels that may be presented on a monitor. After client device 4 uses the data within the first range to convert the data in the second range into the presentable data, client device 4 may present the presentable data. In this way, client device 4 presents the requested segment of the media object.

The techniques of this disclosure may provide several advantages. As illustrated in the example of FIG. 1, network 10 may include a web cache server 12 that is geographically located closer to client device 4 than is media server 8. Web cache server 12 receives HTTP requests generated by client device 4. When cache server 12 receives a HTTP request addressed to a server, a cache manager 16 in web cache server 12 determines whether a resource cache 18 in web cache server 12 stores data of a resource hosted by the server that is associated with the resource identifier specified by the HTTP request. The data of the resource may be all or a portion of the data of the resource. For instance, web cache server 12 may receive a HTTP request addressed to media server 8 that specifies the range $1000^{th}$ byte to $2000^{th}$ byte of a media object associated with a particular resource identifier. In this instance, cache manager 16 determines whether resource cache 18 stores bytes 1000 through 2000 of the media object identified by the particular resource identifier.

If resource cache 18 does not store data of the resource specified by the HTTP request within the range specified by the HTTP request, cache manager 16 may send a HTTP request that specifies the resource identified of the resource and specifies the range to the server that hosts the resource. When web cache server 12 receives the resource in response to the HTTP request sent by cache manager 16, cache manager 16 may store the resource in resource cache 18.

If cache manager 16 determines that resource cache 18 stores the resource or after web cache server 12 receives the resource in response to the HTTP request sent by cache manager 16, cache manager 16 may provide the resource to client device 4. Furthermore, if web cache server 12 has cached a resource and receives a HTTP request that specifies a range of data within the resource, cache manager 16 may respond to the HTTP request with data of the resource within the specified range. Because web cache server 12 is closer to client device 4 than is media server 8, web cache server 12 may provide the requested data more quickly than media server 8.

The techniques of this disclosure may enable effective use web cache server 12. To illustrate this, system 2 in the example of FIG. 1 includes client devices 14A through 14N (collectively, "client devices 14"). Client devices 14, like client device 4, may output requests that specify the resource identifier of the media object hosted by media server 8. Because requests generated by client device 4 and client device 14 use the same resource identifier to request segments of the media object and because cache manager 16 uses the resource identifier to determine whether resource cache 18 stores data of the media object, cache manager 16 may recognize that resource cache 18 stores data of the media object and may respond appropriately. In this way, if client devices 14 request any portion of the resource after client device 4 requests the resource, client devices 14 may receive the portions of the resource more quickly than if web cache server 12 were not present. This is in contrast to systems where client devices use different resource identifiers to request different segments of the media object. When client devices use different resource identifiers to request different segments of the media object, cache manager 16 may not recognize that resource cache 18 stores the segments of the media object. This may be especially advantageous of ISPs that operate web cache servers because their customers may be able to access media objects much more quickly and because the ISPs do not need to transfer as much data through their networks.

Figure 2:
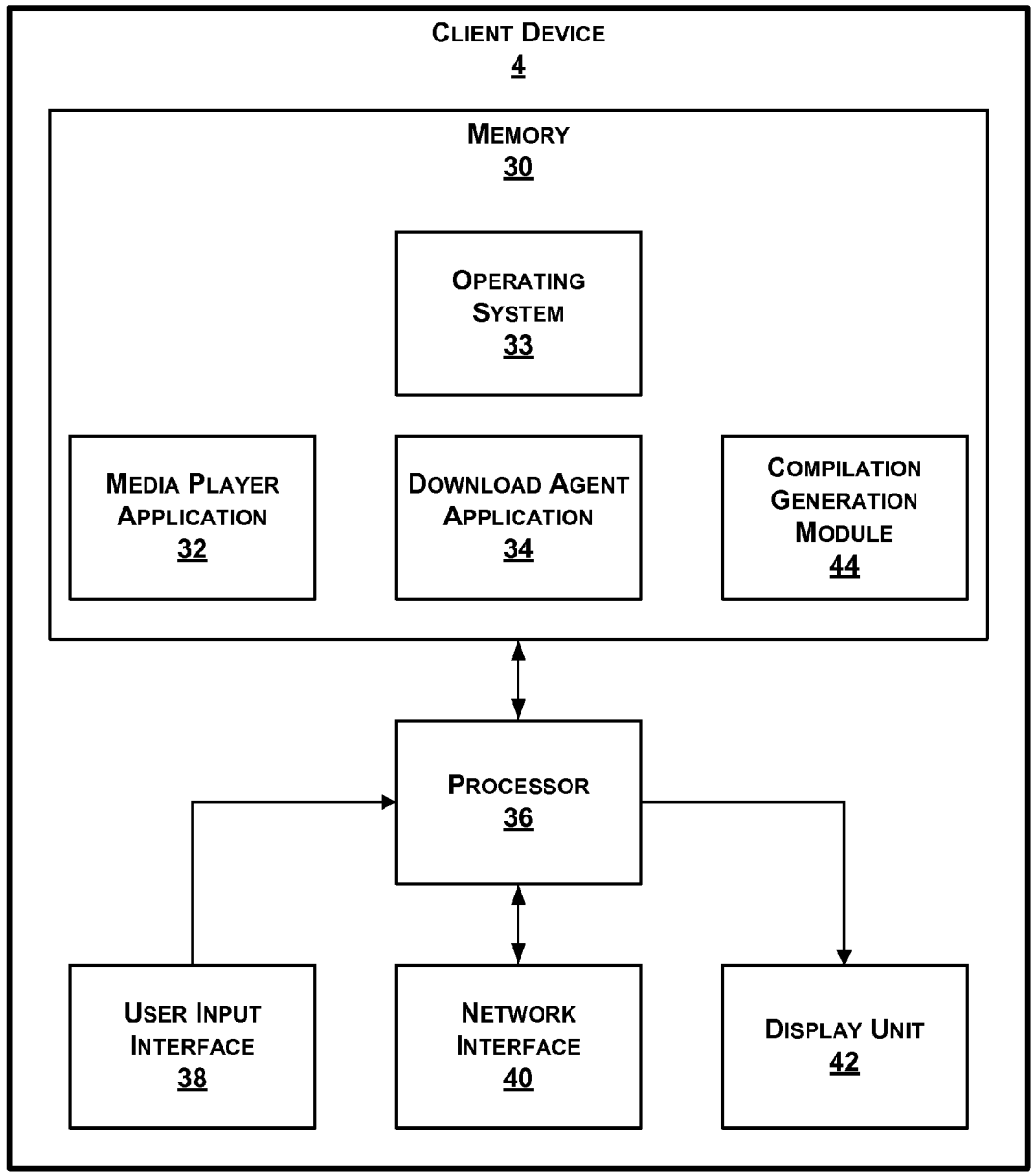
FIG. 2 is a block diagram illustrating exemplary details of a client device.

FIG. 2 is a block diagram illustrating exemplary details of client device 4. As illustrated in the example of FIG. 2, client device 4 comprises a memory 30. Memory 30 is a computer-readable medium. For instance, memory 30 may be a random access memory, a hard-disk drive, a flash memory unit, an optical disc (e.g., CD-ROM, DVD, BluRay disc, etc), or another type of computer-readable medium. In the example of FIG. 2, memory module 30 stores instructions that constitute a media player application 32, an operating system 33, a download agent application 34, and a compilation generation module 44. Although illustrated as a separate component, compilation generation module 44 may be a feature of media player application 32.

Furthermore, in the example of FIG. 2, client device 4 comprises a processor 36 that is capable of executing instructions stored in memory 30. Processor 36 may be an integrated circuit such as a microprocessor, a digital signal processor, an application-specific integrated circuit, or another type of integrated circuit. When executed, the instructions of media player application 32, operating system 33, download agent application 34, and compilation generation module 44 may cause processor 36 to perform one or more acts. For ease of explanation, this disclosure describes acts that instructions of media player application 32, operating system 33, download agent application 34, and compilation generation module 44 cause processor 36 to perform as acts of media player application 32, operating system 33, download agent application 34, and compilation generation module 44.

As illustrated in the example of FIG. 2, client device 4 includes a user input interface 38 that receives input from user 6. For example, user interface 38 may be a keyboard, a mouse, a touch-screen display, or another type of user interface. Furthermore, in the example of FIG. 2, client device 4 includes a network interface 40. Network interface 40 may be an Ethernet interface, a WiFi interface, a Bluetooth interface, a telephone modem interface, or another type of wired or wireless network interface.

User 6 may use user input interface 38 to start media player application 32. When media player application 32 starts, media player application 32 allows user 6 to specify a media object for media player application 32 to present. User 6 may specify a media object for media player application 32 to present by specifying a file name of a locally-stored media object, a URL of a remotely-stored media object, or in another manner. When user 6 specifies a locally-stored media object, media player application 32 may retrieve data of the media object from a local data storage medium and immediately begin presenting the media object.

When user 6 specifies a remotely-stored media object by specifying a URL of the remotely-stored media object, media player application 32 may separate the resource identifier portion of the URL from a domain name portion of the URL. For example, user 6 may specify the URL "http://www.example.com/media/video1.flv". In this example, media player application 32 may separate the URL into the resource identifier portion "/media/video1.flv" and the domain name portion "www.example.com". Next, media player application 32 may generate an HTTP request that specifies the resource identifier of the media object. In the previous example, media player application 32 may generate the HTTP request:

GET /media/video1.flv HTTP/1.0

After generating the HTTP request, media player application 32 may instruct operating system 33 to send the HTTP request to a server associated with the domain name "www.example.com". When media player application 32 instructs operating system 33 to send an HTTP request, operating system 33 provides the HTTP request to download agent application 34. Operating system 33 may provide the HTTP request to download agent application 34 because when download agent application 34 was installed, download agent application 34 may have modified settings in operating system 33 in order to configure operating system 33 to provide HTTP requests from media player application 32 to download agent application 34. Note that operating system 33 may not cause network interface 40 to output the HTTP request generated by media player application 32.

When download agent application 34 receives a HTTP request to be transmitted to a server, download agent application 34 determines whether the resource identifier specified in the HTTP request indicates a segment of a media object that is less than all of the media object. Download agent application 34 may determine whether the resource identifier specified in the HTTP request indicates a segment of a media object that is less than all of the media object by parsing the resource identifier specified by the HTTP request. For instance, the HTTP request may specify the resource identifier "/media/video2.flv?start=5". In this instance, download agent application 34 may determine that this resource identifier indicates a segment of the media object that is less than all of the media object because the resource identifier specifies a start point.

If the HTTP request indicates a segment of the media object that is not less than all of the media object, download agent application 34 may instruct operating system 33 to use output the HTTP request to the server. In response, operating system 33 may instruct network interface 40 to output the HTTP request. Subsequently, when network interface 40 in client device 4 receives data in response to the HTTP request, operating system 33 may notify download agent application 34 that client device 4 has received data in response to the HTTP request. When download agent application 34 receives notification that client device 4 has received data in response to the HTTP request, download agent application 34 may instruct operating system 33 to notify media player application 32 that client device 4 has received data in response to the HTTP request generated by media player application 32. Because media player application 32 may be unaware of the existence of download agent application 34, media player application 32 may interpret the receipt of the data to be in direct response to HTTP request generated by media player application 32.

If the HTTP request indicates a segment of the media object that is less than all of the media object, download agent application 34 may request and receive range identification data associated with the media object. As described above with regard to FIG. 1, download agent application 34 may use the range identification data associated with the media object to identify a first range and a second range.

After download agent application 34 identifies the first range and the second range, download agent application 34 may generate two separate HTTP requests. A first one of the HTTP requests specifies a portion of the resource identifier that is generic to all of the media object. For example, if download agent application 34 receives a HTTP request that specifies the resource identifier "/media/video2.flv?start=5", download agent application 34 may generate the first HTTP request such that the first HTTP request specifies the resource identifier "/media/video2.flv". The first HTTP request also includes a range element that specifies the first range of data within the media object. The first range of data within the media object comprises metadata regarding media data within the media object. A second one of the HTTP requests specifies the portion of the resource identifier that is generic to all of the media object and the second range of data within the media object. The second range of data within the media object includes data that represents the requested segment of the media object.

After download agent application 34 generates the first HTTP request and the second HTTP request, download agent application 34 may instruct operating system 33 to cause network interface 40 to output the first HTTP request and the second HTTP request to the server. Subsequently, operating system 33 may notify download agent application 34 that network interface 40 has received data in response to the first HTTP request. When operating system 33 notifies download agent application 34 that network interface 40 has received data in response to the first HTTP request, download agent application 34 may notify media player application 32 that client device 4 has received a first portion of the media object specified in the HTTP request generated by media player application 32. In this way, download agent application 34 "provides" the data of the media object in the first range to media player application 32.

Furthermore, operating system 33 may notify download agent application 34 that network interface 40 has received data in response to the second HTTP request. When operating system 33 notifies download agent application 34 that network interface 40 has received data in response to the second HTTP request, download agent application 34 may determine whether client device 4 has received all data of the media object in the first range. If download agent application 34 determines that client device 4 has not received all data of the media object in the first range, download agent application 34 may wait until client device 4 has received all data of the media object in the first range. If download agent application 34 determines that client device 4 has received all data of the media object in the first range, download agent application 34 may instruct operating system 33 to notify media player application 32 that client device 4 has received additional data in the media object requested by media player application 32.

In this way, download agent application 34 "provides" the data of the media object in the second range to media player application 32.

When operating system 33 notifies media player application 32 that client device 4 has received data of the media object requested by media player application 32, media player application 32 may use the data within the first range to convert the data within the second range into presentable data based on the data within the second range. Media player application 32 may then instruct a presentation unit 42 of client device 4 to present the presentable data. Because download agent application 34 provided the data of the media object in the second range to media player application 32 as though the data of the media object in the second range immediately follows the data of the media object in the first range, media player application 32 in effect presents the only the segment of the media object requested by user 6.

As illustrated in the example of FIG. 2, client device 4 also includes a compilation generation module 44. Compilation generation module 44 may present a user interface that allows user 6 to generate a virtual media object from two or more segments of one or more media objects. For example, compilation generation module 44 may present a graphical user interface that allows user 6 to specify start points and end points within one or more media objects.

After user 6 has specified segments of one or more media objects, compilation generation module 44 may present a user interface that allows user 6 to specify a sequence of segments of the media objects. For example, compilation generation module 44 may present a user interface that allows user 6 to specify that a sequence of segments of the media objects in which a segment of a first media object follows a segment of a second media object that follows a segment of a third media object, and so on.

When user 6 has finished specifying a sequence of segments of the media objects, compilation generation module 44 may generate a URL that indicates the sequence of segments of the media objects. As described below with regard to FIG. 6A, this URL may specify each media object and may specify the start points and end points of each segment of the media object. After compilation generation module 44 generates the URL, compilation generation module 44 may provide the URL to user 6, save the URL, transmit the URL to another device, or perform some other action with regard to the URL.

Figure 3:
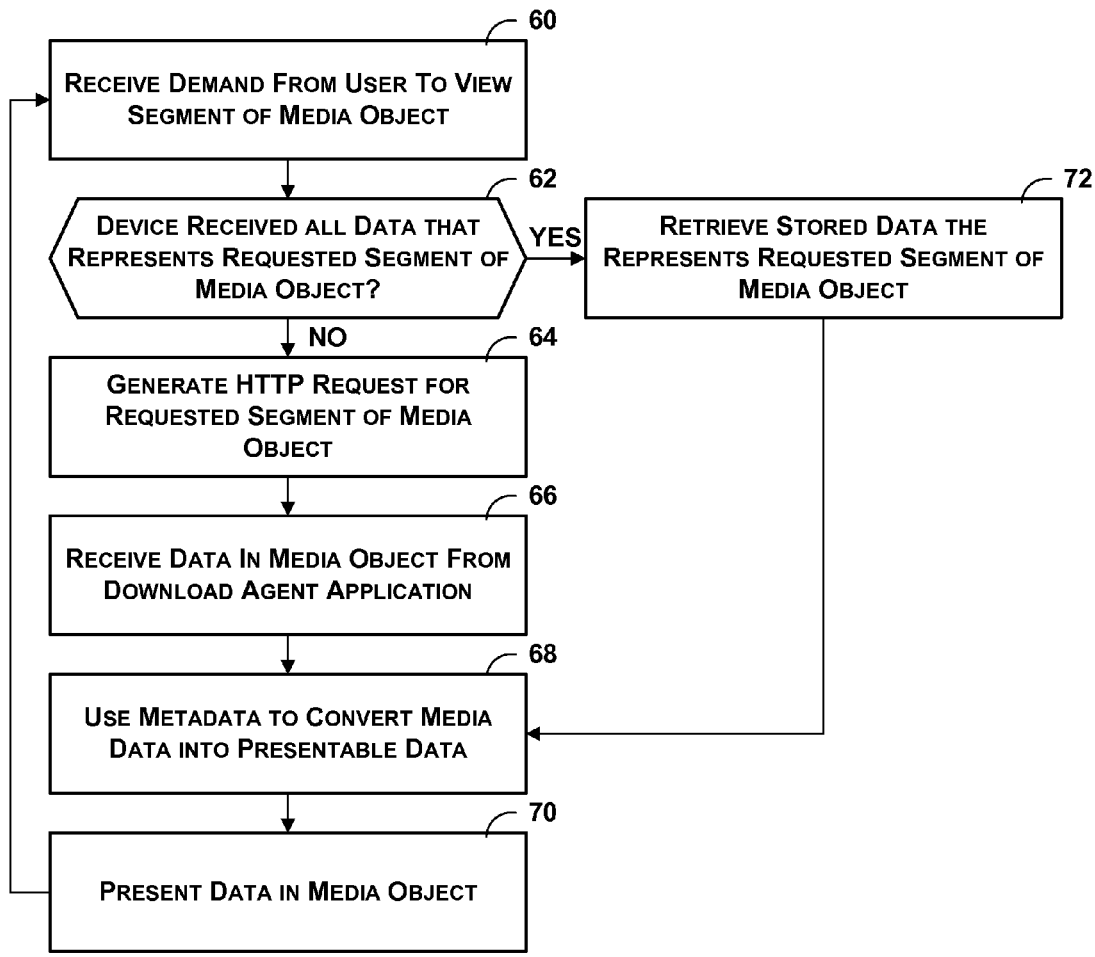
FIG. 3 is a flowchart illustrating an exemplary operation of a media player application operating on a client device.

FIG. 3 is a flowchart illustrating an exemplary operation of client device 4. In accordance with this exemplary operation, media player application 32 may receive a demand from user 6 to view a segment a media object (60). This segment may be all or part of the media object. After receiving the demand from user 6, media player application 32 may determine whether device 4 has already received all data of the media object that represents the requested segment of the media object (62).

If media player application 32 determines that device 4 has not already received all data of the media object that represents the requested segment of the media object ("NO" of 62), media player application 32 may generate a HTTP request that specifies a resource identifier of the media object (64). Subsequently, media player application 32 may receive the data of the media object from download agent application 34 (66). When media player application 32 receives data of the media object, media player application 32 may convert data of the media object into presentable data (68). As media player application 32 converts the data of the media object into presentable data, media player application 32 may present the presentable data (70). Prior to or after presenting some presentable data, media player application 32 may receive a new demand from user 6 to view a segment of the media object. When media player application 32 receives a new demand from user 6 to view a segment of the media object, media player application 32 loops back and again receives the demand from user 6 to view the segment of the media object (60), and so on.

On the other hand, if media player application 32 determines that device 4 has already received all data of the media object that represents the requested segment of the media object ("YES" of 62), media player application 32 may retrieve the received data that represents the requested segment of the media object from a local computer-readable medium (72). The received data may include metadata and media data. The metadata may be stored as data in a first range of an original media object and the media data may be stored as data in a second range of the original media object. The metadata describes the media data. After retrieving the data that represents the requested segment of the media object, media player application 32 may use the metadata to convert the media data into presentable data (68). As media player application 32 converts the media data into presentable data, media player application 32 may present the presentable data (70), and so on.

Figure 4:
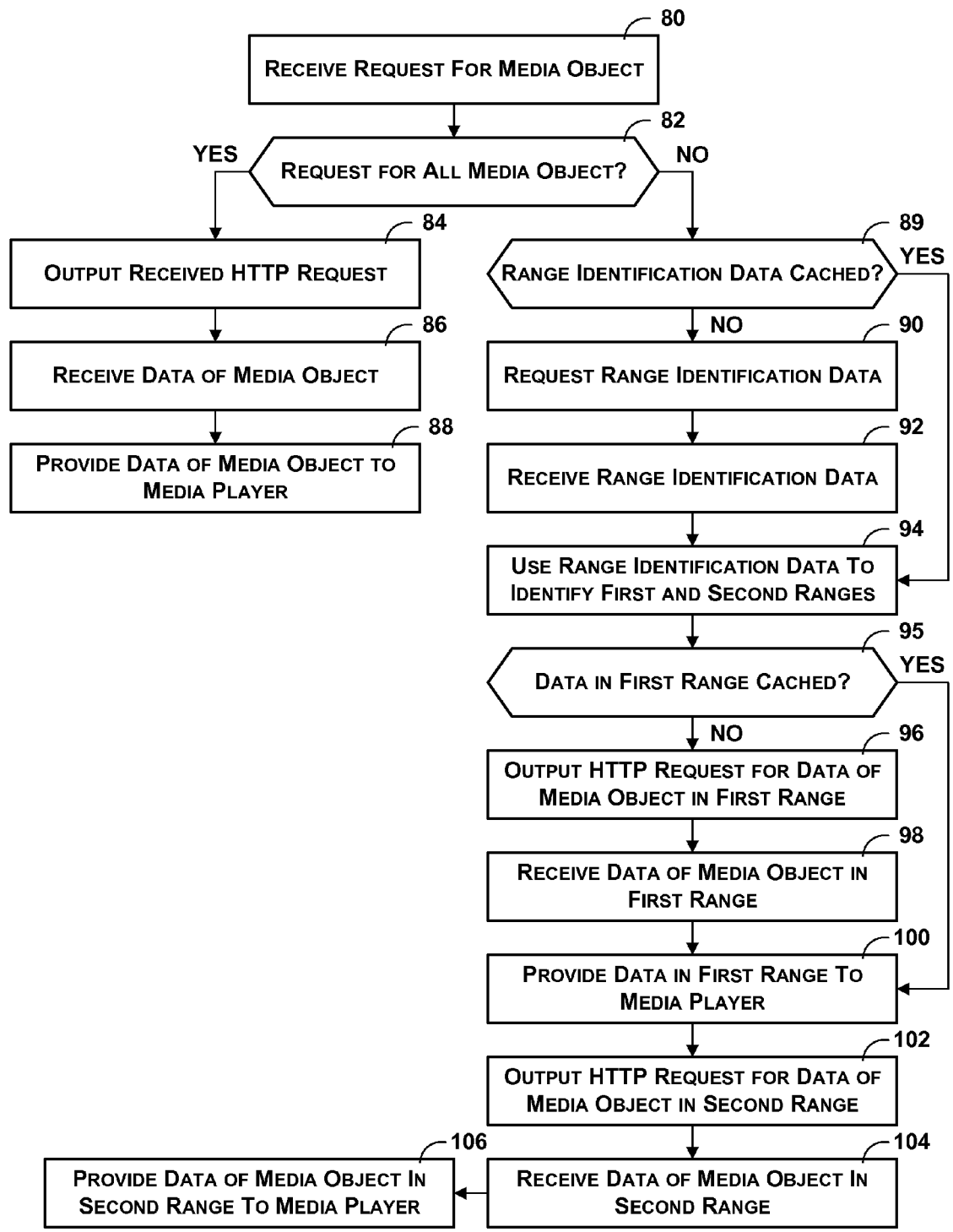
FIG. 4 is a flowchart illustrating an exemplary operation of a download agent application.

FIG. 4 is a flowchart illustrating an exemplary operation of download agent application 34. Because download agent application 34 is integrated into the network stack of client device 4 in such a way that download agent application 34 receives HTTP requests generated by media player application 32 before client device 4 sends the HTTP requests generated by media player application 32, download agent application 34 may receive a HTTP request by media player application 32 to get a media object from media server 8 (80).

When download agent application 34 receives the HTTP request by media player application 32, download agent application 34 determines whether the HTTP request is a request to retrieve a segment of the media object that constitutes all of the media object (82). If download agent application 34 determines that the HTTP request is requesting all of the media object ("YES" of 82), download agent application 34 may cause network interface 40 to output the HTTP request generated by media player application 32 (84). Subsequently, download agent application 34 may receive data in the requested media object (86). When download agent application 34 receives data of the media object in the requested media object, download agent application 34 may provide the data of the media object to media player application 32 (88).

On the other hand, if download agent application 34 determines that the HTTP request is for a segment of the media object that is not all of the media object ("NO" of 82), download agent application 34 may determine whether download agent application 34 has previously downloaded and cached range identification data associated with the media object (89). If download agent application 34 has not cached range identification data associated with the media object ("NO" of 89), download agent application 34 may send a request to media server 8 for range identification data associated with the media object (90). Subsequently, download agent application 34 may receive the range identification data associated with the media object from media server 8 (92). As described above, the range identification data associated with the media object may specify byte indexes associated with metadata of the media object that describes media data in the media object. In addition, the range identification data may specify a key frame list that indicates playback points associated with key frames of the media object and corresponding byte indexes. After receiving the range identification data or after determining that download agent application 34 has cached the range identification data associated with the media object ("YES" of 89), download agent application 34 may use the range identification data associated with the media object to identify a first range and a second range (94). The metadata of the media object (i.e., the data of the media object within the first range) may indicate a format and possibly other information. The data of the media object in the second range represents the requested segment of the media object.

After download agent application 34 identifies the first range and the second range, download agent application 34 may determine whether download agent application 34 has previously downloaded and cached the data of the media object in the first range (95). If download agent application 34 has not previously downloaded and cached the data of the media object in the first range ("NO" of 95), download agent application 34 may cause network interface 40 to output a first HTTP request that specifies the resource identifier of all of the media object and indicates the first range (96). Subsequently, download agent application 34 may receive data of the media object in the first range (98). After download agent application 34 receives data of the media object in the first range or after download agent application 34 determines that download agent application 34 has cached the data of the media object in the first range ("YES" of 95), download agent application 34 may provide the data of the media object in the first range to media player application 32 as a first portion of the requested media object (100).

After providing the data of the media object that is within the first range to media player application 32, download agent application 34 may cause network interface 40 to output a second HTTP request that specifies the resource identifier of all of the media object and indicates the second range (102). Data of the media object in the second range represents the requested segment of the media object. Note that in some implementations, download agent application 34 may output this second HTTP request at any time after download agent application identifies the second range. Download agent application 34 may subsequently receive data of the media object in the second range (104). When download agent application 34 receives data of the media object in the second range, download agent application 34 provides data of the media object in the second range to media player application 32 as a portion of the requested media object that immediately follows the first portion of the requested media object (106).

Figure 5:
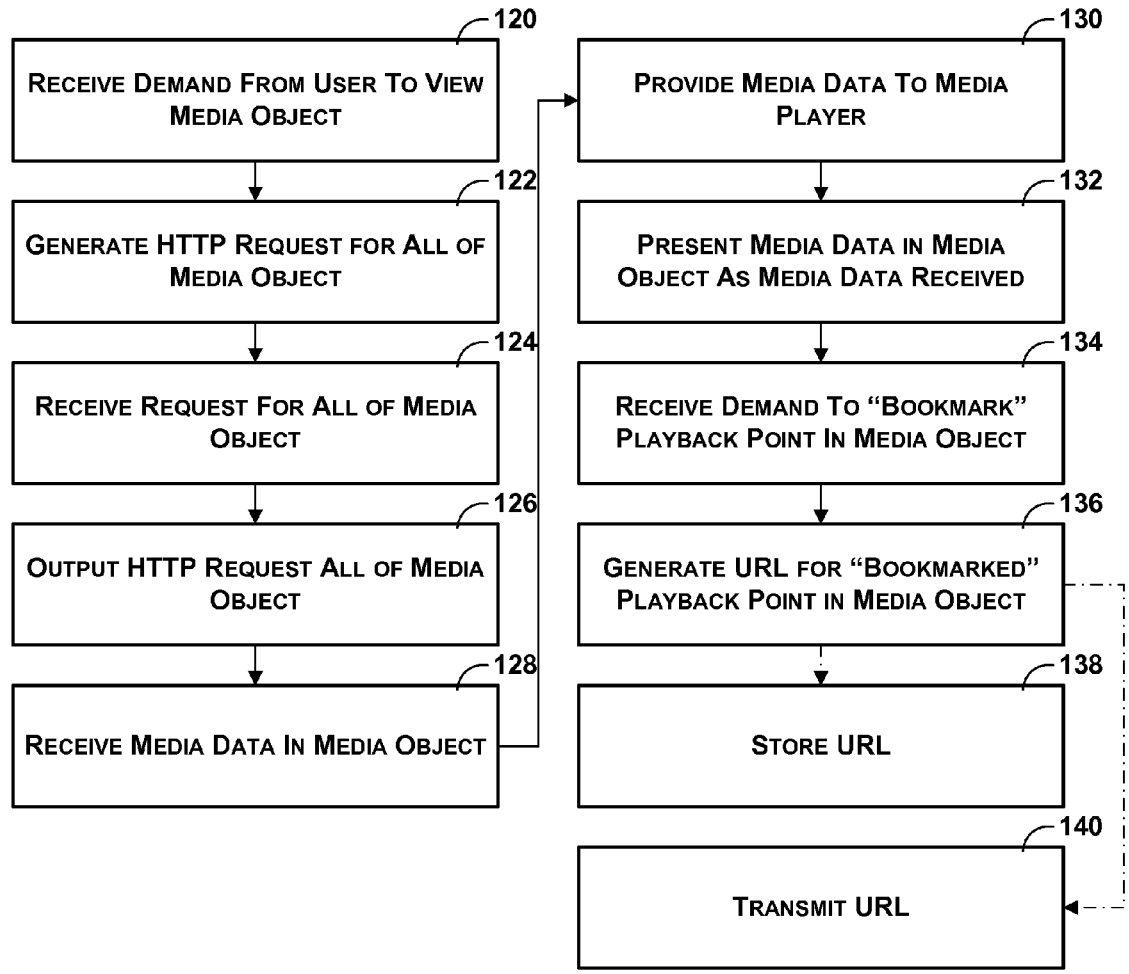
FIG. 5 is a flowchart illustrating an exemplary operation of the client device when a user a bookmarks a playback position in a media file.

FIG. 5 is a flowchart illustrating an exemplary operation of client device 4 when a user requests a bookmark in a media file. In accordance with the exemplary operation illustrated in the example of FIG. 5, media player application 32 may receive a demand from user 6 to view all of a media object (120). After media player application 32 has received the request to view all of the media object, media player application 32 may generate a HTTP request that specifies a resource identifier associated with all of the media object (122).

Subsequently, download agent application 34 receives the HTTP request generated by media player application 32 (124). When download agent application 34 receives the HTTP request generated by media player application 32, download agent application 34 outputs the HTTP request for all of the media object (126). Download agent application 34 may subsequently receive media data in the media object (128). Upon receiving data in the media object, download agent application 34 may provide the data to media player application 32 (130). When media player application 32 receives data of the media object, media player application 32 may present data based on the data in the media object (132).

After media player application 32 has presented at least some data based on the data in the media object, media player application 32 may receive a demand from user 6 to "bookmark" a playback point of the media object (134). For example, media player application 32 may receive a demand from user 6 to bookmark a playback point of the media object at the $6^{th}$ minute of the media object. When media player application 32 receives a demand from user 6 to bookmark a playback point of the media object, media player application 32 may generate a URL that indicates the bookmarked playback point of the media object (136). For example, media player application 32 may generate a URL that indicates a resource identifier of the media object and a byte index of a byte within media object associated with the bookmarked playback point. In this example, if download agent application 34 subsequently receives a URL of this format, download agent application 34 may remove the byte index of the byte from the URL and use the byte index of the byte as a starting byte of a range element in a second HTTP request as described above.

After generating the URL, media player application 32 may store the URL for future use (138). For instance, if user 6 requests that media player application 32 present a media object associated with the URL, media player application 32, with the assistance of download agent application 34, may present the portion of the media object that follows the bookmark. In this way, user 6 would not have to download and wait through the portion of the media object that precedes the bookmark if user 6 is only interested in the portion of the media object that follows the bookmark. Alternatively, media player application 32 or user 6 may transmit the URL to another device (140). When media player application 32 or user 6 transmits the URL to another device, a user of the other device may request that a media player application operating on the other device present a media object associated with the URL. In response, the media player operation on the other device may present the portion of the media object that follows the bookmark. In this way, user 6 can share a portion of a media object with another user without forcing the other user to download and wait through uninteresting portions of the media object.

Figure 6A:
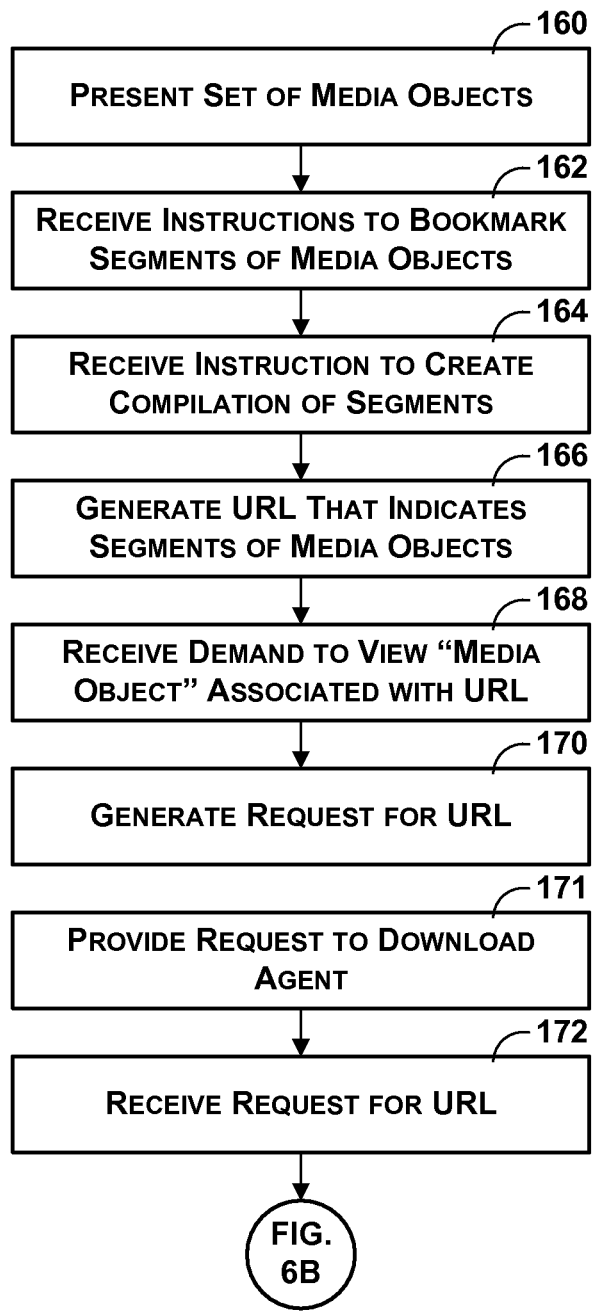
FIG. 6A is a flowchart illustrating a first part of an exemplary operation of the client device when processing segments of two or more media objects.

FIG. 6A is a flowchart illustrating a first part of an exemplary operation of client device 4 when processing segments of two or more media objects. In the exemplary operation of FIG. 6A, compilation generation module 44 may present a set of one or more media objects (160). When compilation generation module 44 presents the set of media object, compilation generation module 44 may receive instructions from user 6 to bookmark segments of the media objects (162). In a first example, compilation generation module 44 may receive instructions from user 6 to bookmark minutes 2 through 4 of a first media object and minutes 6 through 9 of a second media object. In a second example, compilation generation module 44 may receive instructions from user 6 to bookmark minutes 5 through 8 of a first media object and minutes 10 through 12 of the first media object.

After compilation generation module 44 receives such instructions to bookmark segments of media objects, compilation generation module 44 may receive an instruction from user 6 to create a compilation of the segments of the media objects (164). Continuing the first example, compilation generation module 44 may receive an instruction from user 6 to create a compilation in which minutes 2 through 4 of the first media object are followed by minutes 6 through 9 of the second media object. When compilation generation module 44 receives an instruction from user 6 to create a compilation of segments of media objects, compilation generation module 44 may generate a URL that indicates a sequence of the segments of the media objects (166). Continuing the previous example, media player application 32 may generate the URL: "http://www.example1.com/video/first_media object.fvm?start=2 min&end=4 min; w ww.xyz.com/media/second_media_object.fvm?start=6 min&end=9 min". In this way, from the perspective of user 6 this URL may identify a single media object. However, because the URL actually indicates separate segments of one or more media objects, the URL may be considered to identify a "virtual media object." In the second example described above, compilation generation module 44 may generate the URL: "http://www.example1.com/video/first_media_object.flv?start=5 min&end=8 min; www.example1.com/video/first_media_object.flv?start=10 min&end=12 min".

Subsequently, media player application 32 may receive a demand from user 6 to present a virtual media object associated with the URL (168). When media player application 32 receives the request to present a virtual media object associated with the URL, media player application 32 may generate a HTTP request that requests the virtual media object associated with the URL (170). For example, media player application 32 may generate the following HTTP request and instruct operating system 33 to send the following HTTP request to a server associated with the domain name "www.example1.com":

GET/video/first_media media_object.flv?start=2 min&end=4 min;www.xyz.com/media/second_media_object.flv?start=6 min&end=9 min HTTP/1.0

In an alternative operation, media player application 32 may explicitly instruct operating system 33 to send the HTTP request to download agent application 34.

After media player application 32 instructs operating system 33 to send the HTTP request to the server, operating system 33 may provide the HTTP request to download agent application 34 (171). Operating system 33 may not cause network interface 40 to output this HTTP request. Operating system 33 may, for example, provide the HTTP request to download agent application 34 because operating system 33 may be configured to provide all HTTP requests from media player application 32 to download agent application 34. In another example, when operating system 33 receives an HTTP request from media player application 32, operating system 33 may determine whether the resource identifier in the HTTP request includes an ampersand followed by a complete URL. If, in this example, operating system 33 determines that the resource identifier in the HTTP request includes an ampersand followed by a complete URL, operating system 33 may provide the HTTP request to download agent application 34.

When operating system 33 provides the HTTP request to download agent application 34, download agent application 34 receives the HTTP request (172). Continuing the previous example, operating system 33 may provide to download agent application 34 the HTTP request GET/video/first_media media_object.flv?start=2 min&end=4 min;www.xyz.com/media/second_media_object.flv?start=6 min&end=9 min HTTP/1.0

Note that in this example client device 4 does not send this HTTP request to the server associated with the domain name "www.example1.com".

Figure 6B:
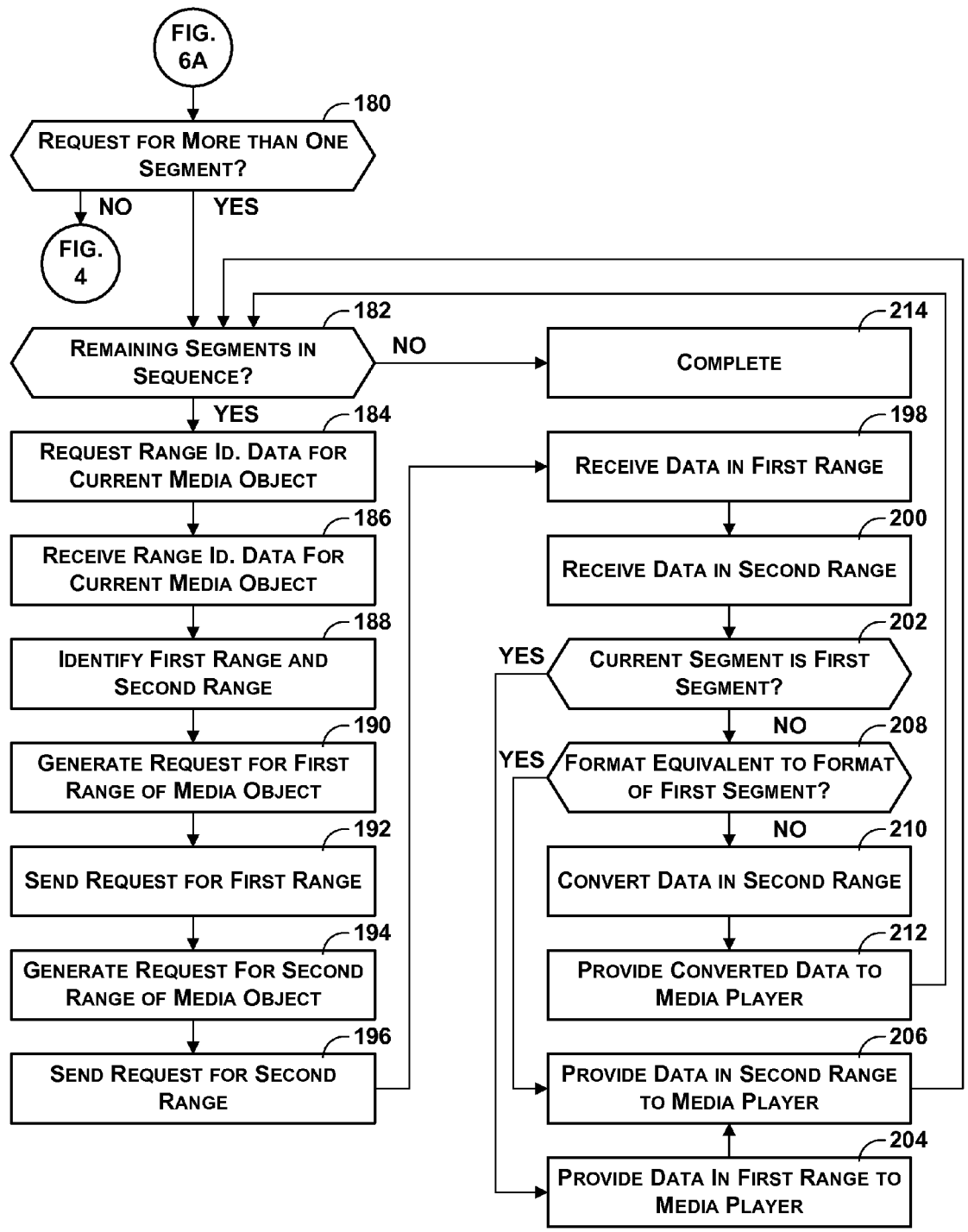
FIG. 6B is a flowchart illustrating a second part of an exemplary operation of the client device when processing segments of two or more media objects.

FIG. 6B is a flowchart illustrating a second part of an exemplary operation of client device 4 when processing multiple segments. When download agent application 34 receives the HTTP request in step (172) of FIG. 6A, download agent application 34 may determine whether the resource identifier in the HTTP request indicates more than one media object (180). Continuing the example described with regard to FIG. 6A, when download agent application 34 receives an instruction from operating system 33 to send the HTTP request GET/video/first_media media_object.flv?start=2 min&end=4 min;www.xyz.com/media/second_media_object.flv?start=6 min&end=9 min HTTP/1.0 to "www.example1.com", download agent application 34 may determine that the resource identifier in this HTTP request includes more than one segment of one or more media objects. In this example, download agent application 34 may determine that the resource identifier in this HTTP request includes more than one segment of one or more media objects because the resource identifier includes a string "www.xyz.com/media/second_media_object.flv?start=6 min&end=9 min" that may independently indicate a segment of a media object.

If download agent application 34 determines that the resource identifier in the HTTP request does not indicate more than one media object ("NO" of 180), download agent application 34 may proceed in the manner illustrated in the example of FIG. 4. On the other hand, if download agent application 34 determines that the resource identifier in the HTTP request indicates more than one media object ("YES" of 180), download agent application 34 may determine whether there are any remaining unprocessed segments in the sequence of segments (182).

If download agent application 34 determines that there are one or more remaining unprocessed segments in the sequence of segments ("YES" of 182), download agent application 34 may, unless download agent application 34 has cached range identification data associated with the media object associated with first unprocessed segment in the sequence, request the range identification data ("RANGE ID.DATA" in FIG. 6B) associated with the media object associated with the first unprocessed segment in the sequence (184). For ease of explanation, this disclosure refers to the media object associated with the first unprocessed segment in the sequence as the "current media object" and the first unprocessed segment in the sequence as the "current sequence." After requesting the range identification data associated with the current media object, download agent application 34 may receive the range identification data associated with the current media object (186). Once download agent application 34 receives the range identification data associated with the current media object, download agent application 34 may use the range identification data associated with the current media object to identify a first range of data in the current media object and a second range of data in the current media object (188). Data of the current media object within the first range indicate metadata regarding other data in the current media object. The data that represents the current segment is within the second range of data in the current media object.

After identifying the first range and the second range, download agent application 34 may, unless download agent application 34 has cached data of the current media object in the first range, generate a HTTP request that includes a resource identifier of all of the current media object and that specifies the first range of data in the current media object (190). Continuing the previous example, if the first segment indicated by the URL is the current segment and if the first 100 bytes of the first media object store the metadata of the first media object, download agent application 34 may generate a first HTTP message:

GET /video/first_media_object.fvm HTTP/1.0

Range: bytes=0-99

Alternatively, in this example, if the second segment indicated by the URL is the current segment and if the first 150 bytes of the second media object store the metadata of the second media object, download agent application 34 may generate a second HTTP message:

GET /media/second_media_object.fvm HTTP/1.0
Range: bytes=0-149

After generating the HTTP request for the first range of the current media object, download agent application 34 may, unless download agent application 34 has cached data of the current media object in the first range, instruct network interface 40 to send the HTTP request to a server that hosts the current media object (192). Continuing the previous example, if the first segment indicated by the URL is the current segment, download agent application 34 may cause network interface 40 to send this first HTTP message to a server associated with the domain name "www.example1.com".

After generating and sending the HTTP request, download agent application 34 may generate a HTTP request that includes a resource identifier of all of the current media object and that specifies the second range of data in the current media object (194). Continuing the previous example, if the first segment indicated by the URL is the current segment and if bytes 700 through 2000 of the first media object represent minutes 2 through 4 of the first media object, download agent application 34 may generate a third HTTP request message:

GET /video/first_media_object.fvm HTTP/1.0
Range: bytes=700-2000

Furthermore, in this example, if the second segment indicated by the URL is the current segment and if bytes 8000-10000 of the second media object represent minutes 6 through 9 of the second media object, download agent application 34 may generate a fourth HTTP request message:

GET /media/second_media_object.fvm HTTP/1.0
Range: bytes=8000-10000

After generating the HTTP request for data of the current media object in the second range, download agent application 34 may cause network interface 40 to send the HTTP request to a server identified with the domain name indicated in the HTTP request received from media player application 32 (196). Continuing the previous example, download agent application 34 may cause network interface 40 to send the third HTTP request message to a server associated with the domain name "www.example1.com" and may cause network interface 40 to send the fourth HTTP request message to a server associated with the domain name "www.xyz.com".

Subsequently, download agent application 34 may receive data of the current media object that is within the first range (198). In addition, download agent application 34 may receive data of the current media object that is within the second range (200). After receiving data of the current media object in the first range, download agent application 34 may determine whether the current segment is the first segment of the sequence (202).

If download agent application 34 determines that the current segment is the first segment of the sequence ("YES" of 202), download agent application 34 may provide data of the current media object in the first range to media player application 32 as part of the requested "virtual" media object (204). After providing data of the current media object in the first range to media player application 32, download agent application 34 may provide data of the current media object in the second range to media player application 32 (206). Once download agent application 32 has provided at least some of the data of the current media object to media player application 32, download agent application 34 may again determine whether there are any remaining segments in the sequence (182), and so on.

On the other hand, if download agent application 34 determines that the current segment is not the first segment of the sequence ("NO" of 202), download agent application 34 may determine whether a format indicated by the data of the current media object in the first range is equivalent to a format indicated by data within a first range of the first media object associated with the first segment of the sequence (208). If download agent application 34 determines that the formats are equivalent ("YES" of 208), download agent application 34 may provide data of the current media object in the second range to media player application 32 as part of the requested "virtual" media object (204). After download agent application 34 provides data of the current media object in the second range to media player application 32, download agent application 34 may again determine whether there are any remaining segments in the sequence (206), and so on.

Otherwise, if download agent application 34 determines that the formats are not equivalent ("NO" of 208), download agent application 34 may convert the data of the current media object in the second range from the format indicated by the data of the current media object in the first range to the format indicated by data within a first range of the first media object associated with the first segment of the sequence (210). For example, the data of the first media object that is within the first range may indicate data that is encoded in accordance with the H.264 standard and the data of the current media object that is within the second range may indicate data that is encoded in accordance with the H.263 standard. In this example, download agent application 34 may convert the data of the current media object that is within the second range from the H.263 format to the H.264 format. After converting the data, download agent application 34 may provide the converted data to media player application 32 as part of the requested "virtual" media object (212). When download agent application 34 provides the converted data to media player application 32, download agent application 34 again determines whether there are any remaining unprocessed segments in the sequence (182), and so on.

If download agent application 34 determines that there are no remaining unprocessed segments in the sequence, the role of download agent application 34 is complete with regard to the sequence (214).

While FIG. 6B has explained the exemplary operation in terms of sequential generation and output of HTTP requests, it should be understood that download agent application 34 may generate and output the HTTP requests in parallel. When download agent application 34 generates and outputs the HTTP requests in parallel, download agent application 34 may be able to pre-cache the segments of the media objects in order to attain better performance.

Figure 7:
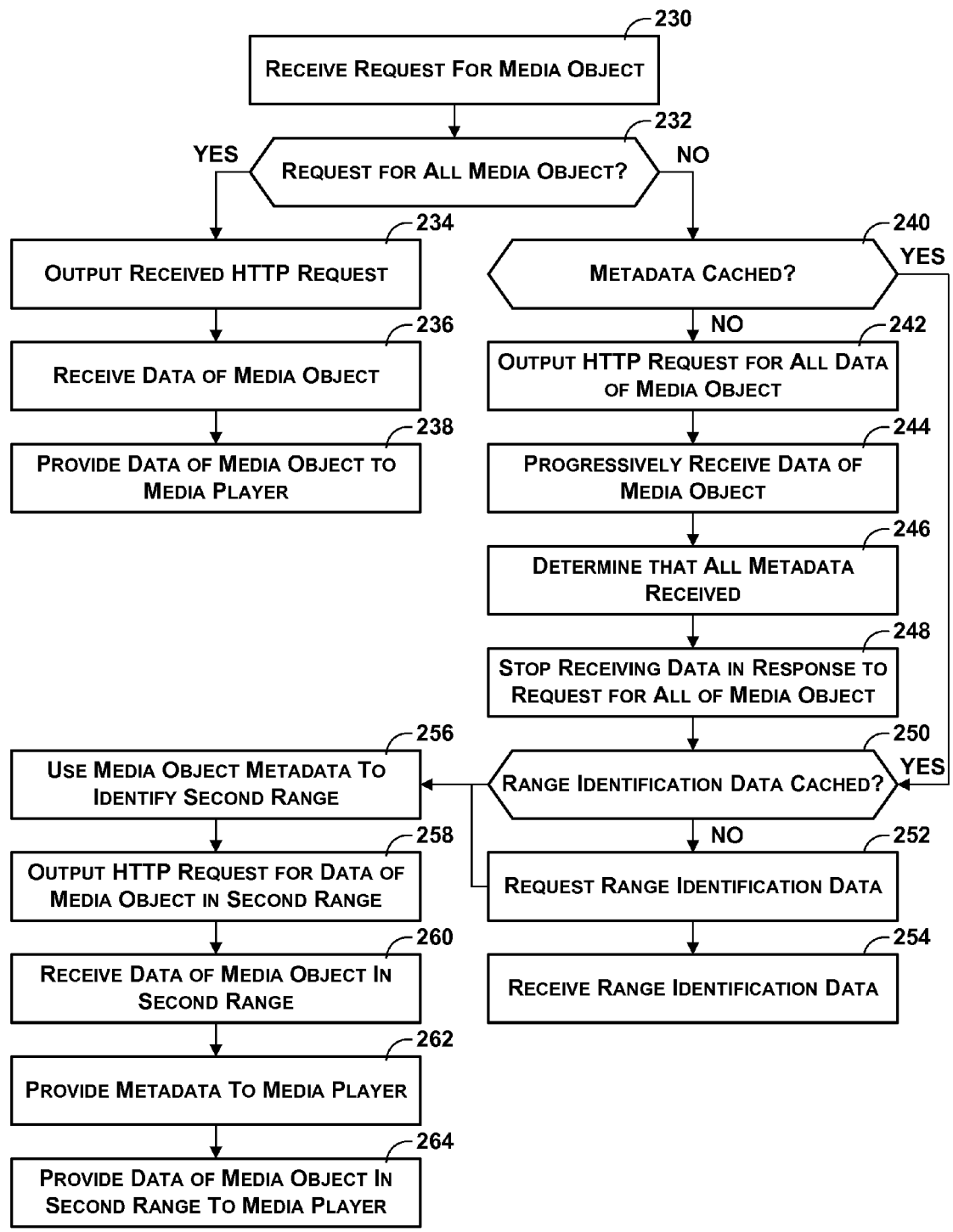
FIG. 7 is a flowchart illustrating an alternative exemplary operation of the download agent application.

FIG. 7 is a flowchart illustrating an alternate exemplary operation of download agent application 34. Because download agent application 34 is integrated into the network stack of client device 4 in such a way that download agent application 34 receives HTTP requests generated by media player application 32 before client device 4 sends the HTTP requests generated by media player application 32, download agent application 34 may receive a HTTP request by media player application 32 to get a media object from media server 8 (230).

When download agent application 34 receives the HTTP request by media player application 32, download agent application 34 determines whether the HTTP request is a request to retrieve a segment of the media object that constitutes all of the media object (232). If download agent application 34 determines that the HTTP request is requesting all of the media object ("YES" of 232), download agent application 34 may cause network interface 40 to output the HTTP request generated by media player application 32 (234). Subsequently, download agent application 34 may receive data in the requested media object (236). When download agent application 34 receives data of the media object in the requested media object, download agent application 34 may provide the data of the media object to media player application 32 (238).

On the other hand, if download agent application 34 determines that the HTTP request is for a segment of the media object that is not all of the media object ("NO" of 232), download agent application 34 may determine whether download agent application 34 has cached metadata of the media object (240). The metadata of the media object may constitute data in a first range of the media object.

If download agent application 34 determines that download agent application 34 has not cached metadata of the media object ("NO" of 240), download agent application 34 may output a first HTTP request that request all of the data in the media object (242). This first HTTP request may specify a resource identifier associated with all of the media object and does not specify a range of data in the media object. After download agent application 34 outputs the first HTTP request, download agent application 34 may progressively receive data in the media object (244). That is, download agent application 34 may receive data associated with later parts of the media object after receiving data associated with earlier parts of the media object.

As download agent application 34 progressively receives data in the media object, download agent application 34 may determine whether download agent application 34 has received the metadata of the media object (246). For instance, download agent application 34 may determine that download agent application 34 has received all metadata of the media object when download agent application 34 begins receiving media data of the media object. When download agent application 34 determines that download agent application 34 has received all metadata of the media object, download agent application 34 may stop receiving data of the media object that download agent application 34 is receiving in response to the first request (248). In other words, download agent application 34 may "hang up" when download agent application 34 receives all of the metadata of the media object and may stop progressively receiving the data of the media object.

After download agent application 34 stops receiving data of the media object that download agent application 34 is receiving in response to the first request or after determining that download agent application 34 has cached the metadata of the media object ("YES" of 240), download agent application 34 may determine whether download agent application 34 has previously downloaded and cached range identification data associated with the media object (250). If download agent application 34 has not cached range identification data associated with the media object ("NO" of 250), download agent application 34 may send a request to media server 8 for range identification data associated with the media object (252). Subsequently, download agent application 34 may receive the range identification data associated with the media object from media server 8 (254). The range identification data associated with the media object may specify a key frame list that indicates playback points associated with key frames of the media object and corresponding byte indexes.

After receiving the range identification data or after determining that download agent application 34 has cached the range identification data associated with the media object ("YES" of 250), download agent application 34 may use the range identification data associated with the media object to identify a second range (256). The data of the media object in the second range represents the requested segment of the media object. After download agent application 34 identifies the second range, download agent application 34 causes network interface 40 to output a second HTTP request that specifies the resource identifier of all of the media object and indicates the second range (258). Subsequently, download agent application 34 may receive data of the media object in the second range (260).

Download agent application 34 may then provide the metadata of the media object to media player application 32 as a first portion of the requested media object (262). When download agent application 34 receives data of the media object in the second range, download agent application 34 provides data of the media object in the second range to media player application 32 as a portion of the requested media object that immediately follows the first portion of the requested media object (264).

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory ("RAM") such as synchronous dynamic random access memory ("SDRAM"), read-only memory ("ROM"), non-volatile random access memory ("NVRAM"), electrically erasable programmable read-only memory ("EEPROM"), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various embodiments of the invention have been described. These and other embodiments are within the scope of the following claims.

The invention claimed is:

1. A method comprising:
receiving, by a device, a demand to present a segment of a media object, wherein the media object includes key frames and frames encoded based upon the key frames, the segment begins at a starting playback point of the media object after an initial playback point of the media object, and the device has not yet received any data that is within the segment when the demand to present the segment of the media object is received;
outputting, by the device, in response to receiving the demand, a request for range identification data associated with the media object, wherein the request specifies a resource identifier associated with all data in the media object and the range identification data includes:
  information for identifying at least one portion of the media object that includes the metadata; and
  a key frame list comprising respective byte indexes associated with key frames of the media object;
receiving, by the device, the range identification data in response to the request for range identification data;
determining, by the device, a first range of the media object based upon the information, wherein the first range includes metadata employable for converting the data in the media object within a second range from a first encoding format into a second encoding format and the data that is within the segment of the media object is within the second range;
identifying, by the device, a lower end of the second range as a first byte index associated with a first key frame closest to the starting playback point of the segment; and
identifying, by the device, an upper end of the second range as a second byte index associated with a second key frame closest to an ending playback point of the media object corresponding to an end of the segment.

2. The method of claim 1, further comprising:
outputting, by the device, a first request that specifies the resource identifier and the first range of the media object, and a second request that specifies the resource identifier and the second range of the media object;
in response to the first request, receiving, by the device, data of the media object that is within the first range; and
in response to the second request, receiving, by the device, data of the media object that is within the second range.

3. The method of claim 2, further comprising:
using, by the device, the data of the media object that is within the first range to convert the data of the media object within the second range from the first encoding format to the second encoding format; and
presenting, by the device, the data of the media object within the second range in the second encoding format.

4. The method of claim 2:
wherein the outputting the first request comprises instructing one or more network interfaces to output a first HTTP request that includes, in a header of the first HTTP request, the resource identifier associated with all data in the media object and a range element that specifies the first range; and
wherein the outputting the second request comprises instructing the one or more network interfaces to output a second HTTP request that includes, in a header of the second HTTP request, the resource identifier associated with all data in the media object and a range element that specifies the second range.

5. The method of claim 1, further comprising:
receiving, by the device, user input specifying a plurality of segments of at least one media object to include in a virtual media object;
generating, by the device, a Uniform Resource Locator for the virtual media object that includes:
  respective resource identifiers associated with all data in the at least one media object; and
  respective start and end points for the plurality of segments.

6. The method of claim 5, further comprising requesting, by the device, the virtual media object using the Uniform Resource Locator.

7. The method of claim 1, wherein the receiving the demand to present the segment of the media object comprises:
receiving a Uniform Resource Locator that indicates the segment of the media object, wherein the Uniform Resource Locator includes a domain portion and a resource identifier portion; and
extracting the resource identifier from the resource identifier portion.

8. The method of claim 1, further comprising:
receiving, by the device, a demand to bookmark a playback point in the media object; and
in response to the receiving the demand to bookmark the playback point, generating, by the device, a Uniform Resource Locator comprising at least the resource identifier and a parameter specifying the playback point.

9. The method of claim 8, further comprising:
instructing, by the device one or more network interfaces to send the Uniform Resource Locator to another device.

10. The method of claim 1, wherein the media object comprises at least one of video or audio.

11. A device comprising:
a processor;
a memory communicatively coupled to processor, the memory having stored therein computer-executable instructions, comprising:
  a media player configured to receive a demand to present a segment of a media object, wherein the media object includes key frames and frames encoded based upon the key frames, the segment begins at a starting a playback point of the media object after an initial playback point of the media object, and the device has not yet received any data that is within the segment when the demand to present the segment of the media object is received;
  a download agent configured to:
    output, in response to receiving the demand, a request for range identification data associated with the media object, wherein the request specifies a resource identifier associated with all data in the media object and wherein the range identification data includes:
      information for identifying at least one portion of the media object that includes the metadata; and
      a key frame list comprising respective byte indexes associated with key frames of the media object;
    receive the range identification data in response to the request for range identification data;
    determine a first range of the media object based upon the information, wherein the first range includes metadata employable for converting the data in the media object within a second range from a first encoding format into a second encoding format and the data that is within the segment of the media object is within the second range;
    identify a lower end of the second range as a first byte index associated with a first key frame closest to the starting playback point of the segment; and
    identify an upper end of the second range as a second byte index associated with a second key frame closest to an ending playback point of the media object corresponding to an end of the segment.

12. The device of claim 11, wherein the download agent if further configured to:
in response to the media player receiving the demand, output a first request that specifies the resource identifier and the first range of the media object, and a second request that specifies the resource identifier and the second range of the media object, wherein the data that is within the segment of the media object is within the second range;

in response to the first request, receive data of the media object that is within the first range; and in response to the second request, receive the data of the media object that is within the second range.

13. The device of claim 12, wherein the media player is further configured to use the data of the media object that is within the first range to convert the data within the second range from the first encoding format to the second encoding format, and present the data of the media object within the second range in the second encoding format.

14. The device of claim 12, wherein the download agent is further configured to:

instruct one or more network interfaces to output the first request as a first HTTP request that includes, in a header of the first HTTP request, the resource identifier associated with all data in the media object and a range element that specifies the first range; and instruct the one or more network interfaces to output the second request as a second HTTP request that includes, in a header of the second HTTP request, the resource identifier associated with all data in the media object and a range element that specifies the second range.

15. The device of claim 11, wherein the media player is further configured to:

receive user input specifying a plurality of segments of at least one media object to include in a virtual media object;

generating a Uniform Resource Locator for the virtual media object that includes:

respective resource identifiers associated with all data in the at least one media object; and respective start and end points for the plurality of segments.

16. The device of claim 15, wherein when the media player is further configured to request the virtual media object using the Uniform Resource Locator.

17. The device of claim 11, wherein the media player is further configured to:

receive a Uniform Resource Locator that indicates the segment of the media object as part of the demand to present the segment of the media object, wherein the Uniform Resource Locator includes a domain portion and a resource identifier portion; and extract the resource identifier from the resource identifier portion.

18. The device of claim 11, wherein the media player is further configured to:

receive a demand to bookmark the playback point in the media object; and in response to the demand to bookmark the playback point, generate a Uniform Resource Locator comprising at least the resource identifier and a parameter specifying the playback point.

19. The device of claim 18, wherein the media player is further configured to instruct one or more network interfaces to send the Uniform Resource Locator to another device.

20. The device of claim 11, wherein the media object comprises at least one of video or audio.

21. A non-transitory computer-readable medium having instructions stored thereon that, when executed by one or more processors of a device, cause the one or more processors to perform operations comprising:

receiving a demand to present a segment of a media object, wherein the media object includes key frames and frames encoded based upon the key frames, the segment begins at a starting playback point of the media object after an initial playback point of the media object, and the device has not yet received any data that is within the segment of the media object when the demand to present the segment of the media object is received;

outputting, in response to receiving the demand, a request for range identification data associated with the media object, wherein the request specifies a resource identifier associated with all data in the media object and the range identification data includes:

information for identifying at least one portion of the media object that includes the metadata; and a key frame list comprising respective byte indexes associated with key frames of the media object;

receiving, the range identification data in response to the request for range identification data;

determining a first range of the media object based upon the information, wherein the first range includes metadata employable for converting the data in the media object within a second range from a first encoding format into a second encoding format and the data that is within the segment of the media object is within the second range;

identifying a lower end of the second range as a first byte index associated with a first key frame closest to the starting playback point of the segment; and identifying an upper end of the second range as a second byte index associated with a second key frame closest to an ending playback point of the media object corresponding to an end of the segment.

22. The non-transitory computer-readable medium of claim 21, the operations further comprising:

outputting, by the device, a first request that specifies the resource identifier and the first range of the media object, and a second request that specifies the resource identifier and the second range of the media object;

in response to the first request, receiving, by the device, data of the media object that is within the first range; and in response to the second request, receiving, by the device, data of the media object that is within the second range.

23. The non-transitory computer-readable medium of claim 22, the operations further comprising:

using the data of the media object that is within the first range to convert the data of the media object within the second range from the first encoding format to the second encoding format; and presenting the data of the media object within the second range in the second encoding format.

24. A system comprising:

means for receiving a demand to present a segment of a media object, wherein the media object includes key frames and frames encoded based upon the key frames, the segment begins at a starting playback point of the media object after an initial playback point of the media object, and the device has not yet received any data that is within the segment of the media object when the demand to present the segment of the media object is received;

means for outputting, in response to receiving the demand, a request for range identification data associated with the media object, wherein the request specifies a resource identifier associated with all data in the media object and the range identification data includes:

information for identifying at least one portion of the media object that includes the metadata; and a key frame list comprising respective byte indexes associated with key frames of the media object;

receiving, the range identification data in response to the request for range identification data;

means for determining a first range of the media object based upon the information, wherein the first range includes metadata employable for converting the data in the media object within a second range from a first encoding format into a second encoding format and the data that is within the segment of the media object is within the second range;

means for identifying a lower end of the second range as a first byte index associated with a first key frame closest to the starting playback point of the segment; and means for identifying an upper end of the second range as a second byte index associated with a second key frame closest to an ending playback point of the media object corresponding to an end of the segment.

25. The system of claim 24, further comprising:

means for receiving user input specifying a plurality of segments of at least one media object to include in a virtual media object;

means for generating a Uniform Resource Locator for the virtual media object that includes:
  respective resource identifiers associated with all data in the at least one media object; and
  respective start and end points for the plurality of segments.

26. The system of claim 24, further comprising:

means for, in response to the demand, outputting a first request that specifies the resource identifier and the first range of the media object, and a second request that specifies the resource identifier and the second range of the media object;

means for, in response to the first request, receiving data of the media object that is within the first range; and means for, in response to the second request, receiving the data of the segment of the media object that is within the second range.

27. The system of claim 26, further comprising:

means for employing the data of the media object that is within the first range to convert the data of the media object within the second range from the first encoding format to the second encoding format.

* * * * *